(12) United States Patent
Hu et al.

(10) Patent No.: US 12,007,677 B2
(45) Date of Patent: Jun. 11, 2024

(54) OPTICAL ENGINE UNIT AND PROJECTION SYSTEM

(71) Applicant: APPOTRONICS CORPORATION LIMITED, Guangdong (CN)

(72) Inventors: Fei Hu, Shenzhen (CN); Peng Du, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 3 days.

(21) Appl. No.: 17/762,424

(22) PCT Filed: Aug. 31, 2020

(86) PCT No.: PCT/CN2020/112634
§ 371 (c)(1),
(2) Date: Mar. 22, 2022

(87) PCT Pub. No.: WO2021/063144
PCT Pub. Date: Apr. 8, 2021

(65) Prior Publication Data
US 2022/0334459 A1    Oct. 20, 2022

(30) Foreign Application Priority Data
Sep. 30, 2019   (CN) .......................... 201910943953.4

(51) Int. Cl.
G03B 21/20    (2006.01)
G03B 21/28    (2006.01)

(52) U.S. Cl.
CPC ......... *G03B 21/2066* (2013.01); *G03B 21/28* (2013.01)

(58) Field of Classification Search
CPC .. G03B 21/2066; G03B 21/28; G03B 21/005; G03B 21/20
See application file for complete search history.

(56) References Cited

U.S. PATENT DOCUMENTS

| | | | | |
|---|---|---|---|---|
| 8,388,138 B1* | 3/2013 | Boothroyd | ........... | H04N 9/3167 359/464 |
| 2005/0057729 A1* | 3/2005 | Huang | ................. | G03B 21/005 353/33 |

(Continued)

FOREIGN PATENT DOCUMENTS

| | | |
|---|---|---|
| CN | 101308319 | 11/2008 |
| CN | 103913940 | 7/2014 |

(Continued)

OTHER PUBLICATIONS

Office Action issued in corresponding CN Application 201910943953. 4, dated Feb. 1, 2023, and an English Translation, 8 pages.

(Continued)

*Primary Examiner* — Magda Cruz
(74) *Attorney, Agent, or Firm* — Burris Law, PLLC (57) ABSTRACT

An optical engine unit and a projection system are provided. The optical engine unit includes a light splitting assembly, first and second spatial light modulators, and a light combining assembly. The light splitting assembly splits an illumination beam incident on the light splitting assembly into first and second light beams. The first and second spatial light modulators respectively modulate the first and second light beams to form first and second modulated light beams. The light combining apparatus includes a light combining surface. The light combining surface is a coated surface and configured to combine the first modulated light beam and the second modulated light beam into an emergent light beam and emit the emergent light beam. An incident angle of the first modulated light beam on the light combining surface and that of the second modulated light beam being smaller than a total reflection angle of the light combining surface.

20 Claims, 3 Drawing Sheets

(56) References Cited

U.S. PATENT DOCUMENTS

| | | | |
|---|---|---|---|
| 2011/0007279 A1 | 1/2011 | Silverstein et al. | |
| 2013/0016323 A1* | 1/2013 | Huang | G02B 5/04 |
| | | | 359/834 |
| 2014/0347634 A1 | 11/2014 | Bommerbach et al. | |
| 2016/0299417 A1* | 10/2016 | Lambot | G03B 21/28 |
| 2017/0010524 A1* | 1/2017 | Ishikawa | G03B 21/008 |
| 2017/0269465 A1* | 9/2017 | Bommersbach | G03B 33/12 |
| 2018/0259839 A1* | 9/2018 | Okuda | G03B 33/08 |
| 2022/0214553 A1* | 7/2022 | Guo | G03B 21/208 |

FOREIGN PATENT DOCUMENTS

| | | |
|---|---|---|
| CN | 104730826 | 6/2015 |
| CN | 105204171 | 12/2015 |
| TW | 200817822 | 4/2008 |
| TW | 201303364 | 1/2013 |
| WO | 2009070918 | 6/2009 |
| WO | 2016016939 | 2/2016 |

OTHER PUBLICATIONS

International Search Report for corresponding International Application PCT/CN2020/112634, dated Dec. 2, 2020.

* cited by examiner

OPTICAL ENGINE UNIT AND PROJECTION SYSTEM

CROSS-REFERENCE TO RELATED APPLICATIONS

This application is a National Phase of International Application No. PCT/CN2020/112634, filed on Aug. 31, 2020, which claims priority to and the benefit of CN 201910943953.4, filed on Sep. 30, 2019. The disclosures of the above applications are incorporated herein by reference.

FIELD

The present disclosure relates to the technical field of optics, and in particular, to an optical engine unit and a projection system.

BACKGROUND

The statements in this section merely provide background information related to the present disclosure and may not constitute prior art.

In an optical engine, light splitting assembly and light combining assembly, such as a light splitting panel and a prism, respectively, are usually dielectric coated devices, a transmittance of which is closely related to an angle of light incident on an optical coated surface.

SUMMARY

This section provides a general summary of the disclosure and is not a comprehensive disclosure of its full scope or all of its features.

This disclosure is intended to provide an optical engine unit and a projection system, to reduce a light energy loss during light combining, improve light combining efficiency of a light beam, make no glue used on an optical path, and improve reliability of the optical engine unit.

To resolve the above technical problem, a technical solution adopted in this disclosure is as follows: an optical engine unit is provided. The optical engine unit includes a light splitting assembly, a first spatial light modulator, a second spatial light modulator, and a light combining assembly. The light splitting assembly is configured to split an illumination beam incident on the light splitting assembly into a first light beam and a second light beam. The first spatial light modulator is configured to modulate the first light beam to form a first modulated light beam. The second spatial light modulator configured to modulate the second light beam to form a second modulated light beam. The light combining apparatus includes a light combining surface. The light combining surface is a coated surface, the light combining surface is configured to combine the first modulated light beam and the second modulated light beam into an emergent light beam and emit the emergent light beam, and an incident angle of the first modulated light beam on the light combining surface and that of the second modulated light beam being smaller than a total reflection angle of the light combining surface.

To resolve the above technical problem, a projection system is provided. The projection system includes a light source and the optical engine unit described in any one of the above embodiments, and the light source is configured to emit the illumination beam.

The projection system includes an optical relay system located between the light source and the light splitting assembly and configured to concentrate the illumination beam to a predetermined range.

Embodiments of the present disclosure have the following beneficial effects. The optical engine unit in the embodiments of this disclosure includes the light splitting assembly, the first spatial light modulator, the second spatial light modulator, and the light combining apparatus. The light splitting assembly is configured to split the illumination beam incident on the light splitting assembly into the first light beam and the second light beam, the first spatial light modulator is configured to modulate the first light beam to form the first modulated light beam, and the second spatial light modulator is configured to modulate the second light beam to form the second modulated light beam. The light combining apparatus includes the light combining surface, where the light combining surface is the coated surface and configured to combine the first modulated light beam and the second modulated light beam into the emergent light beam and emit the emergent light beam, and the incident angles of the first modulated light beam and the second modulated light beam on the light combining surface are less than the total reflection angle of the light combining surface. By reducing an incident angle of a light beam on the light combining surface, on the one hand, a large difference between refractive indexes on both sides of a coated medium can be realized, a quantity of designed film layers and a drift of a coating curve can be reduced, so that light combining efficiency can be improved; and on the other hand, no glue can be used on an optical path, so as to improve overall reliability and efficiency of the optical engine unit.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The technical solutions in the embodiments of the present disclosure are clearly and completely described below with reference to the accompanying drawings in the embodiments of the present disclosure. The described embodiments are merely some rather than all of the embodiments of this disclosure. All other embodiments obtained by those of ordinary skill in the art based on the embodiments of the present disclosure without creative efforts should fall within the protection scope of the present disclosure.

An illumination beam emitted from a light source has a certain light cone angle when passing through the light splitting assembly and the light combining assembly. If the transmittance is different due to different incident angles, plenty of light will be easily lost during light splitting and light combining, reducing a utilization rate of light energy.

In related art, the light combining apparatus prevents, through gluing on a light combining surface, total reflection of image light during light combining. A color gamut standard of a projector is met when a glued film layer has a low light combining efficiency, however, the brightness that can be achieved is also limited. In addition, when the glued film layer is used in a high-brightness machine, the spectra is continuously absorbed due to existence of glue on an optical path. The glued film results in serious brightness attenuation and unreliability of the optical machine, so that a repair frequency and a repair cost are greatly increased.

Figure 1:
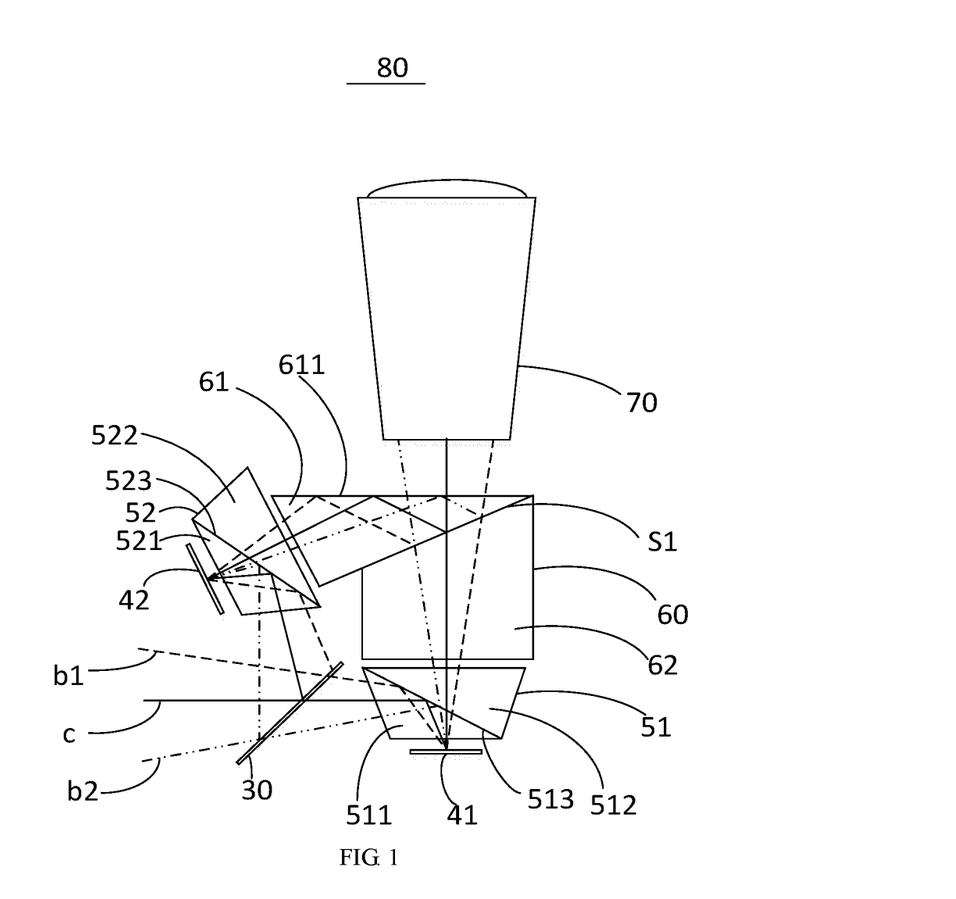
FIG. 1 is a schematic diagram of an optical engine unit according to some embodiments of the present disclosure.

Referring to FIG. 1, FIG. 1 is a schematic diagram of an optical engine unit according to some embodiments of the present disclosure. In some embodiments, the optical engine unit 80 includes a light splitting assembly 30, a first spatial light modulator 41, a second spatial light modulator 42, and a light combining apparatus 60.

The light splitting assembly 30 splits, based on a wavelength characteristic or a polarization characteristic, an illumination beam incident on the light splitting assembly. The light splitting assembly 30 splits the illumination beam into a first light beam and a second light beam. The light splitting assembly 30 can be a dichroic film.

When the light splitting assembly 30 splits the illumination beam based on a characteristic of wavelength, the light splitting assembly 30 reflects light in a first wavelength range and transmits light in a second wavelength range. It can be understood that, in another implementation of the present disclosure, by switching an optical path, the light splitting assembly 30 can alternatively be set to transmit the light in the first wavelength range and reflect the light in the second wavelength range. This is not specifically limited in the present disclosure.

When the light splitting assembly 30 splits the illumination beam based on the polarization characteristic, the light splitting assembly 30 transmits p-polarized light and reflects s-polarized light.

The first spatial light modulator 41 is configured to modulate the first light beam to form a first modulated light beam, and reflect the first modulated light beam carrying image information to the light combining apparatus 60. The second spatial light modulator 42 is configured to modulate the second light beam to form a second modulated light beam, and reflect the second modulated light beam carrying image information to the light combining apparatus 60. The first spatial light modulator 41 and the second spatial light modulator 42 are mirror symmetric with respect to the light splitting assembly 30.

The first spatial light modulator 41 and the second spatial light modulator 42 can be reflective display elements, such as digital micro mirror devices (DMDs). In an embodiment, the first spatial light modulator 41 and the second spatial light modulator 42 may alternatively be liquid crystal on silicon (LCOS) displays or liquid crystal displays (LCDs).

The light combining apparatus 60 includes a light combining surface S1, and the light combining surface S1 is configured to combine the first modulated light beam and the second modulated light beam into an emergent light beam and emit the emergent light beam. A real image formed by the first spatial light modulator 41 and a virtual image formed by the second spatial light modulator 42 are mirror symmetric with respect to the light combining surface S1. In an embodiment, the optical engine unit 80 includes a projection objective 70. The projection objective 70 is opposite to the light combining apparatus 60. The light combining surface S1 combines the first modulated light beam and the second modulated light beam into the emergent light beam, and emits the emergent light beam to the projection objective 70.

In an embodiment, the light combining surface S1 is a coated surface. The light combining surface S1 combines the first modulated light beam and the second modulated light beam based on the wavelength characteristic. Because the light combining surface S1 is the coated surface, its light transmittance is closely related to an angle of a light ray incident on the light combining surface S1. If the incident angle of the light ray is large, the coating design is complex, there are a large quantity of film layers, and a drift of a coating curve is large, lots of light is easily lost during light combining, reducing a utilization rate of light energy.

In order to reduce a light loss and improve reliability of the optical engine unit 80, in an embodiment, the light combining apparatus 60 includes at least one totally reflective surface. The first modulated light beam or the second modulated light beam enters the light combining surface after being reflected by the totally reflective surface, in other words, at least one of the first modulated light beam or the second modulated light beam enters the light combining surface S1 after being reflected at least once, such that angles of the first modulated light beam and the second modulated light beam that are incident on the light combining surface S1 are smaller than a total reflection angle of the light combining surface S1. The incident angles of the first modulated light beam and the second modulated light beam on the light combining surface S1 are reduced, such that the light combining surface S1 does not need to be glued, a difference between refractive indexes of media on both sides of a film layer is large, the drift of the coating curve is small. The reliability of the optical engine unit 80 is greatly improved because there is no glue on the optical path.

It can be understood that the illumination beam includes multiple light sub-beams with different incident angles to the light splitting assembly 30. In an embodiment of this disclosure, a small beam of light with a same incident angle is used as a light sub-beam. As shown in FIG. 1, multiple light sub-beams include a first edge light beam b1, a second edge light beam b2, and a central light beam c. An incident angle of the first edge light beam b1 on the light splitting assembly 30 is smaller than an incident angle of the central light beam c on the light splitting assembly 30. Therefore, a light splitting coating curve corresponding to the first edge light beam b1 is closer to a long wavelength. An angle of a light beam that is obtained by splitting the first edge light beam b1 and is incident on the light combining surface S1 after being modulated by the second spatial light modulator 42 is still smaller than an angle of a light beam that is obtained by splitting the central light beam c and is incident on the light combining surface S1 after being modulated by the second spatial light modulator 42. Therefore, a light combining coating curve corresponding to the first edge light beam b1 is closer to the long wavelength. Likewise, a coating curve of the second edge light beam b2 split on the light splitting assembly 30 is corresponding to that combined on the light combining surface S1 after modulated by the second spatial light modulator 42, and the coating curve is closer to a short wavelength. Therefore, light splitting and combining efficiency of the illumination beam is high, and a light energy loss is small.

In an embodiment, an included angle formed between the first edge light beam b1 and the second edge light beam b2 is θ, an included angle formed between the first spatial light modulator 41 or the second spatial light modulator 42 and the light combining surface S1 is α, and the total reflection angle of the light combining surface S1 is β. Therefore, θ, α, and β satisfy the following formula:

$$\theta + \alpha \leq \beta, \text{namely}, \alpha \leq \beta - \theta.$$

In an embodiment, when the included angle θ between the first edge light beam b1 and the second edge light beam b2 is 12°, and the total reflection angle β of the light combining surface S1 is 42°, namely, a critical angle of a glass prism is 42°, the included angle α between the first spatial light modulator 41 and the light combining surface S1 satisfy: α≤42°-12°, namely, α≤30°.

In the light combining apparatus 60, an incident plane of the first modulated light beam is parallel to the first spatial light modulator 41, and an incident plane of the second modulated light beam is parallel to the second spatial light modulator 42.

In an embodiment, the light combining apparatus 60 includes at least one triple prism and at least one cylindrical prism. The cylindrical prism can be a quadrangular prism or a pentagonal prism, which can be set based on an actual situation.

In an embodiment, a joint surface between the cylindrical prism and another prism is an inclined surface. The joint surface is a surface on which one prism is in contact with another prism. In another embodiment, the light combining apparatus 60 can include at least two triple prisms. For the light combining apparatus including two, three, or more triple prisms, a reflective film is coated on a non-joint surface of the prism to increase the number of reflections of the modulated light beam before the modulated light beam is incident on the light combining surface S1.

In an embodiment, the light combining apparatus 60 includes a first prism 61 and a second prism 62. The first prism 61 and the second prism 62 are adjacent to each other. The first prism 61 includes a first totally reflective surface 611 opposite to a light combining surface S1 on which the first prism 61 and the second prism 62 join each other, and the first totally reflective surface 611 totally reflects a light ray with an incident angle greater than a first threshold. The first threshold is a critical angle at which an incident light ray is totally reflected on the first totally reflective surface 611. The first totally reflective surface 611 can transmit a light ray with an incident angle smaller than the first threshold. The second modulated light beam is reflected by the first totally reflective surface 611 to the light combining surface S1. The second prism 62 is configured to guide the first modulated light beam to the light combining surface S1. The light combining surface S1 combines the first modulated light beam and the second modulated light beam into an emergent light beam and emits the emergent light beam. In order to ensure that the emergent light beam is emitted smoothly, an incident angle of the emergent light beam on the first totally reflective surface 611 is smaller than a total reflection angle of the first totally reflective surface 611.

The first prism 61 can be a prism that is of any shape and includes the first totally reflective surface 611 and the light combining surface S1, for example, in this embodiment, a triangular prism, and the second prism 62 can be a prism that is of any shape and includes the light combining surface S1, for example, in this embodiment, a quadrangular prism, as shown in FIG. 1.

On an optical path of imaging, a real object of the first spatial light modulator 41 is on an image plane of the projection objective 70, while a real object of the second spatial light modulator 42 first forms a virtual image with respect to the first totally reflective surface 611. The virtual image forms a virtual object on the light combining surface S1. The virtual object forms a virtual image through the S1, and the virtual image overlaps with the real object of the first spatial light modulator 41. Therefore, the secondary virtual image formed by the second spatial light modulator 42 through the first totally reflective surface 611 and the light combining surface S1 coincides with the real object of the first spatial light modulator 41 and is located on the image plane of the projection objective 70.

In an embodiment, the optical engine unit includes a first guide assembly 51 and a second guide assembly 52 that are mirror symmetric with respect to the light splitting assembly 30. In an embodiment, the first guide assembly 51 and the second guide assembly 52 are also mirror symmetric with respect to the light combining surface S1.

The first guide assembly 51 guides the first light beam to the first spatial light modulator 41, and guides the first modulated light beam to the light combining apparatus 60. The second guide assembly 52 guides the second light beam to the second spatial light modulator 42, and guides the second modulated light beam to the light combining apparatus 60.

In an embodiment, the first guide assembly 51 includes an eighth prism 511 and a ninth prism 512 that are adjacent to each other. A third totally reflective surface 513 on which the eighth prism 511 and the ninth prism 512 join each other totally reflects a light ray with an incident angle greater than a third threshold. The third threshold is a critical angle at which a light ray is totally reflected on the third totally reflective surface 513. The third totally reflective surface 513 can transmit a light ray with an incident angle less than the first threshold. The first light beam is reflected by the third totally reflective surface 513 to the first spatial light modulator 41. The first modulated light beam is guided to the light combining apparatus 60 after passing through the eighth prism 511 and the ninth prism 512.

The second guide assembly 52 includes a tenth prism 521 and an eleventh prism 522, and the tenth prism 521 and the eleventh prism 522 are adjacent to each other. A fourth totally reflective surface 523 on which the tenth prism 521 and the eleventh prism 522 join each other totally reflects a light ray with an incident angle greater than a fourth threshold. The fourth threshold is a critical angle at which a light ray is totally reflected on the fourth totally reflective surface 523. The fourth totally reflective surface 523 can transmit a light ray with an incident angle less than the fourth threshold. The second light beam is reflected by the fourth totally reflective surface 523 to the second spatial light modulator 42. The second modulated light beam is guided to the light combining apparatus 60 after passing through the tenth prism 521 and the eleventh prism 522.

The eighth prism 511 can be a prism that is of any shape and includes the third totally reflective surface 513, such as a triangular prism. The ninth prism 512 can be a prism that is of any shape and includes the third totally reflective surface 513, such as a triangular prism. The tenth prism 521 can be a prism that is of any shape and includes the fourth totally reflective surface 523, such as a triangular prism. The eleventh prism 522 can be a prism that is of any shape and includes the fourth totally reflective surface 523, such as a triangular prism. In an embodiment, the above prisms may be total internal reflection (TIR) prisms.

Figure 2:
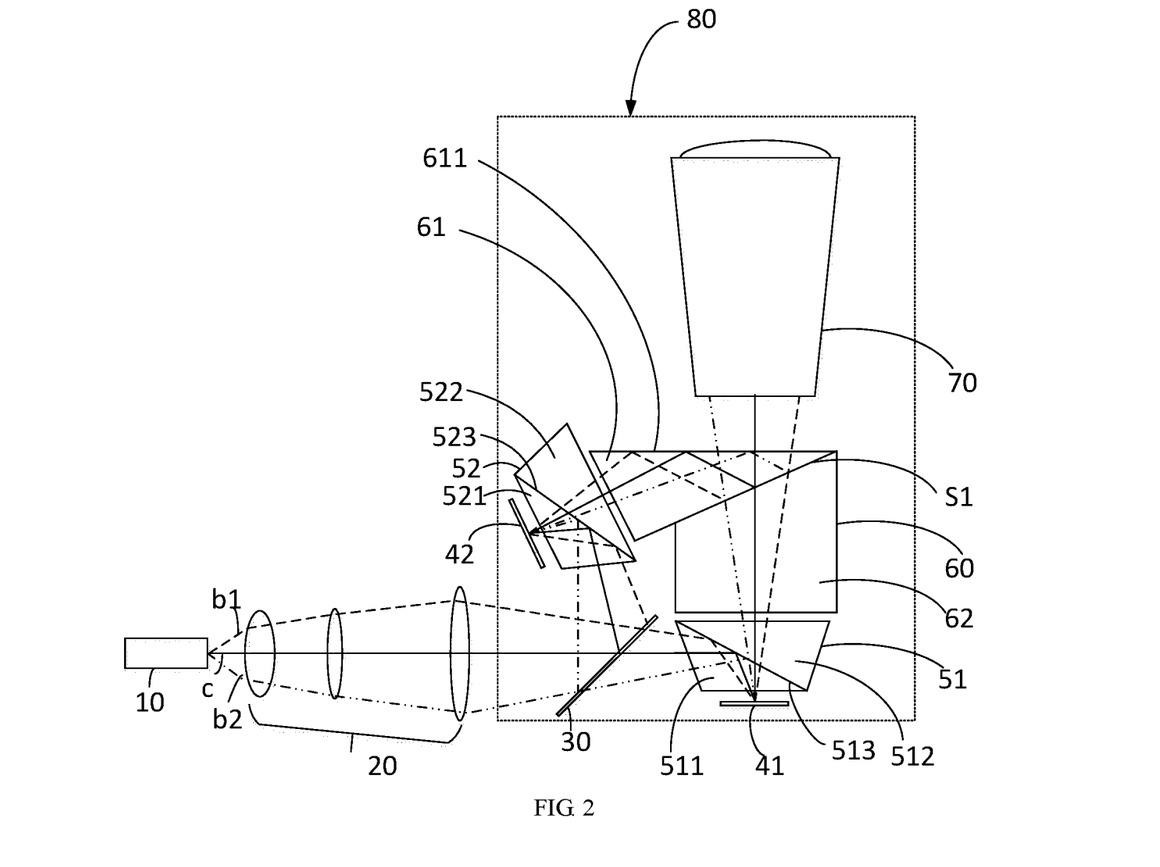
FIG. 2 is a schematic diagram of a projection system according to some embodiments of the present disclosure.

Based on the above optical engine unit 80, the present disclosure also provides a projection system. As shown in FIG. 2, the projection system includes a light source 10 and the above-described optical engine unit 80. The structure of the optical engine unit 80 can be referred to FIG. 1 and the above text description.

The light source 10 is configured to transmit an illumination beam. The illumination beam contains at least two types of primary light. The light source 10 can be a solid-state light source such as a laser diode or a light-emitting diode.

The projection system can include an optical relay system 20. The optical relay system 20 is located between the light source 10 and the light splitting assembly 30 and configured to concentrate the illumination beam to a predetermined range. The optical relay system 20 is configured to relay a light ray emitted from the light source 10.

In the embodiment, the light combining surface is the coated surface. The second modulated light beam is incident on the light combining surface after being totally reflected, to reduce the incident angles of the first modulated light beam and the second modulated light beam on the light combining surface S1, such that the incident angles are less than the total reflection angle of the light combining surface S1. Such configuration can realize a large difference between refractive indexes on both sides of a coated medium, reduce a quantity of designed film layers, reduce a drift of a coating curve, and improve light combining efficiency. The disclosure can make no glue used on the optical path, so as to improve overall reliability and efficiency of the optical engine unit and the whole projection system.

Figure 3:
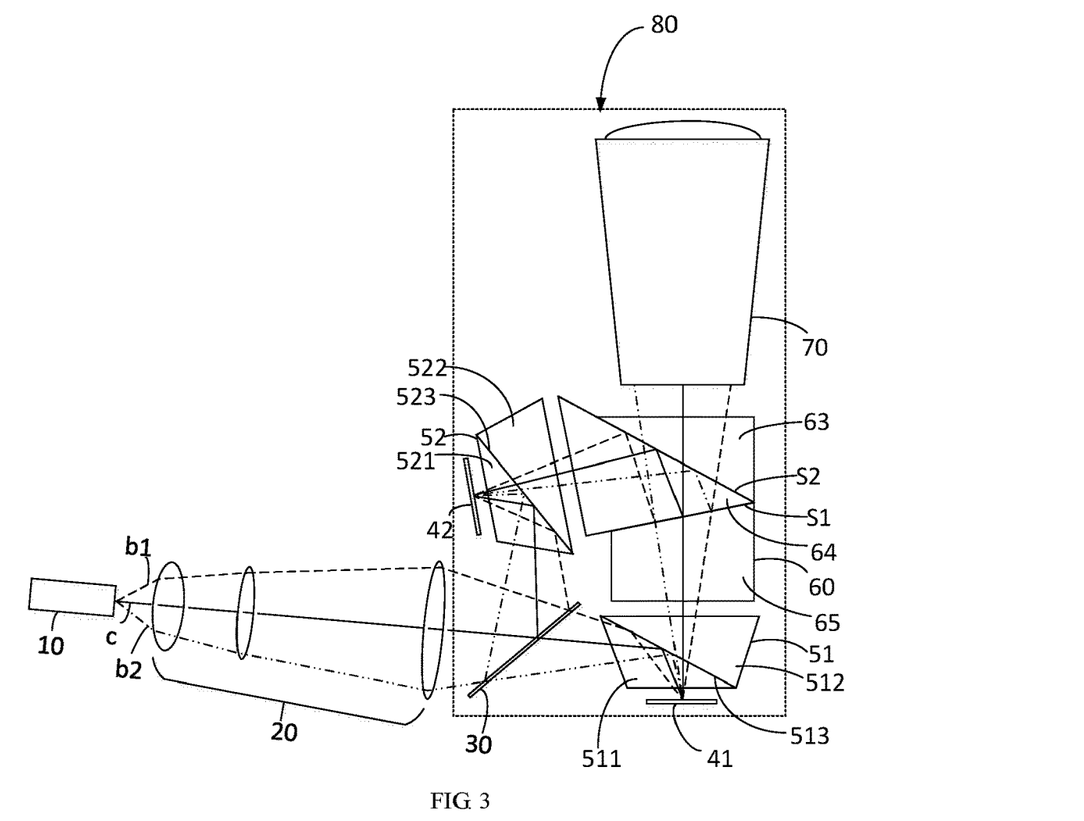
FIG. 3 is a schematic diagram of a projection system according to some embodiments of the present disclosure.

Referring to FIG. 3, FIG. 3 is a schematic diagram of a projection system according to some embodiments of this disclosure. Based on the above embodiments, in the optical engine unit 80 in the embodiment, the light combining apparatus 60 includes a third prism 63, a fourth prism 64, and a fifth prism 65. The fourth prism 64 is located between the third prism 63 and the fifth prism 65, a surface on which the fourth prism 64 and the fifth prism 65 join each other is the light combining surface S1, and a surface on which the third prism 63 and the fourth prism 64 join each other is a fifth totally reflective surface S2. The fifth totally reflective surface S2 can be an anti-reflective coated surface, and reflectivity of the anti-reflective coated surface is smaller than a first preset threshold. The first preset threshold can be set based on an actual situation. When the reflectivity of the anti-reflective coated surface is smaller than the reflectivity of the first preset threshold, the reflectivity of the anti-reflective coated surface is smaller than the reflectivity of a conventional totally reflective surface, to make more light transmitted through the fifth totally reflective surface.

The second modulated light beam is reflected by the fifth totally reflective surface S2 to the light combining surface S1. The fifth prism 65 is configured to guide the first modulated light beam to the light combining surface S1, and the light combining surface S1 combines the first modulated light beam and the second modulated light beam into the emergent light beam and emits the emergent light beam. The emergent light beam is emitted after being guided by the fourth prism 64 and the third prism 63, to supplement an optical path difference. In order to ensure emission of the emergent light beam, an incident angle of the emergent light beam on the fifth totally reflective surface S2 is smaller than a total reflection angle of the fifth totally reflective surface S2.

The fourth prism 64 can be a prism that is of any shape and includes the light combining surface S1 and the anti-reflective surface S2, such as a triangular prism.

The fifth prism 65 can be a prism that is of any shape and includes the light combining surface S1, such as a triangular prism or a quadrangular prism.

The third prism 63 can be a prism that is of any shape and includes the anti-reflective surface S2, such as a triangular prism.

In this embodiment, the structures in the projection system can be referred to the drawing and text description in the above embodiments. Details will not be repeated herein.

In some embodiments, the light combining apparatus 60 includes the third prism 63, the fourth prism 64 and the fifth prism 65. Positions and angles of the fifth totally reflective surface S2 and the light combining surface S1 are reasonably set to reduce the incident angles of the first modulated light beam and the second modulated light beam on the light combining surface S1. In this way, the drift of the coating curve is reduced, and the light combining efficiency of the light beam is increased.

Figure 4:
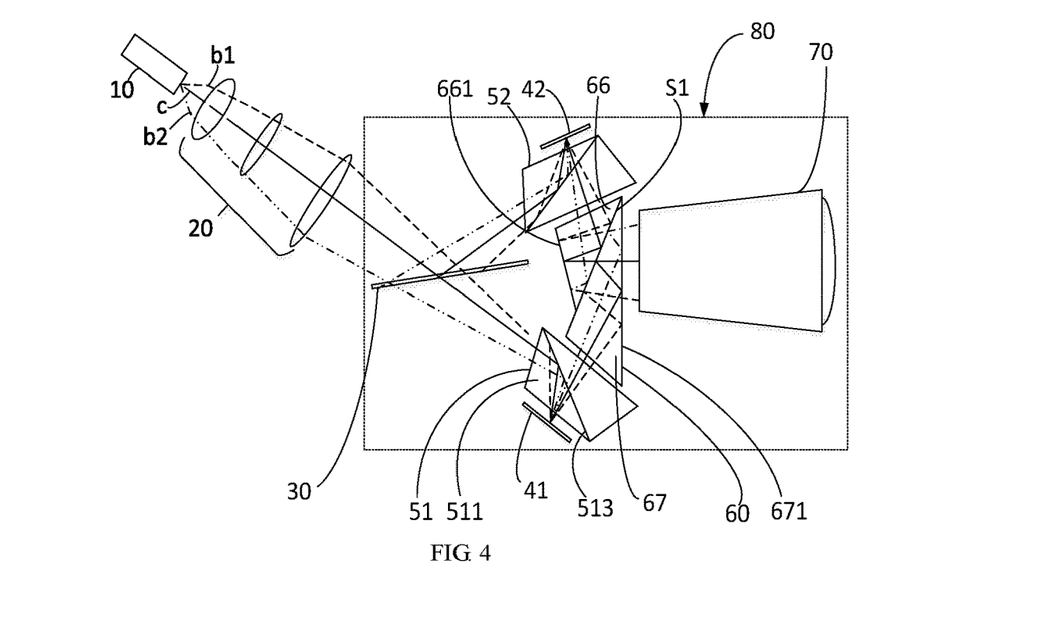
FIG. 4 is a schematic diagram of a projection system according to some embodiments of the present disclosure.

FIG. 4 is a schematic diagram of a projection system according to some embodiments of this disclosure. Based on the above embodiments, referring to FIG. 4, in the optical engine unit 80 in this embodiment, the light combining apparatus 60 includes a sixth prism 66 and a seventh prism 67. The sixth prism 66 and the seventh prism 67 are adjacent to each other, and a surface on which the sixth prism 66 and the seventh prism 67 join each other is the light combining surface S1.

A surface, opposite to the light combining surface S1, of the sixth prism 66 is a reflective surface 661. The reflective surface 661 is a high-reflective coated surface, and reflectivity of the high-reflective coated surface is greater than a second preset threshold. The second preset threshold may be set based on an actual situation. When the reflectivity of the high-reflective coated surface is greater than the second preset threshold, the high-reflective coated surface basically reflects any incident light ray. The second modulated light beam is totally reflected by the S1 to the reflective surface 661, and then reflected by the reflective surface 661 to the light combining surface S1.

The seventh prism 67 is provided a second totally reflective surface 671 opposite to the light combining surface S1. The second totally reflective surface 671 totally reflects a light ray with an incident angle greater than a second threshold. The second threshold is a critical angle at which a light ray is totally reflected on the second totally reflective surface 671. The second totally reflective surface 671 can transmit a light ray with an incident angle smaller than the second threshold. The first modulated light beam is reflected by the second totally reflective surface 671 to the light combining surface S1, and the light combining surface S1 combines the first modulated light beam and the second modulated light beam into the emergent light beam and emits the emergent light beam. The emergent light beam is emergent after being guided by the seventh prism 67. In order to ensure emission of the emergent light beam, an angle of the emergent light beam incident on the second totally reflective surface 671 is smaller than a total reflection angle of the second totally reflective surface 671.

The sixth prism 66 can be a prism that is of any shape and includes the light combining surface S1 and the reflective surface 661, such as a triangular prism.

The seventh prism 67 can be a prism that is of any shape and includes the light combining surface S1 and the second totally reflective surface 671, such as a triangular prism.

In this embodiment, the structures in the projection system can be referred to the drawing and text description in some embodiments. Details will not be repeated herein.

Based on the above embodiments, the first modulated light beam and the second modulated light beam are incident on the light combining surface S1 after being reflected at least once, and the second modulated light beam enters the light combining surface after being reflected twice, which can reduce the incident angles of the first modulated light beam and the second modulated light beam on the light combining surface, thereby reducing the drift of the coating curve and improve the light combining efficiency of the light beam.

The above described are merely implementations of this disclosure, which do not limit the scope of the patent of this disclosure. Any equivalent structure or equivalent process change made based on the description and drawings of this disclosure, or direct or indirect disclosure thereof in other related technical fields, should still fall in the protection scope of the patent of this disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An optical engine unit, comprising:
    a light splitting assembly configured to split an illumination beam incident on the light splitting assembly into a first light beam and a second light beam;
    a first spatial light modulator configured to modulate the first light beam to form a first modulated light beam;
    a second spatial light modulator configured to modulate the second light beam to form a second modulated light beam; and
    a light combining apparatus comprising a light combining surface, wherein the light combining surface is a coated surface and configured to combine the first modulated light beam and the second modulated light beam into an emergent light beam and emit the emergent light beam, and an incident angle of the first modulated light beam on the light combining surface and that of the second modulated light beam being smaller than a total reflection angle of the light combining surface.

2. The optical engine unit according to claim 1, wherein the light combining apparatus comprises at least one totally reflective surface.

3. The optical engine unit according to claim 2, wherein the first modulated light beam or the second modulated light beam enters the light combining surface after being reflected by the totally reflective surface.

4. The optical engine unit according to claim 3, wherein an included angle formed between the light combining surface and the first spatial light modulator satisfies:

$$\theta + \alpha \leq \beta,$$

where the illumination beam comprises a first edge light beam and a second edge light beam, $\theta$ representing an included angle formed between the first edge light beam and the second edge light beam, $\alpha$ representing the included angle between the light combining surface and the first spatial light modulator, and $\beta$ representing the total reflection angle of the light combining surface.

5. The optical engine unit according to claim 1, wherein the first light beam is parallel to the first spatial light modulator on an incident surface of the light combining apparatus, and the second light beam is parallel to the second spatial light modulator on the incident surface of the light combining apparatus.

6. The optical engine unit according to claim 1, wherein the light combining apparatus at least comprises one triple prism and one cylindrical prism.

7. The optical engine unit according to claim 1, wherein at least one of the first modulated light beam or the second modulated light beam enters the light combining surface after being reflected at least once in the light combining apparatus.

8. The optical engine unit according to claim 2, further comprising:
    a first guide assembly located at a side of the first spatial light modulator, wherein the first guide assembly is configured to guide the first light beam to the first spatial light modulator and guide the first modulated light beam to the light combining apparatus; and
    a second guide assembly located at a side of the second spatial light modulator, wherein the second guide assembly is configured to guide the second light beam to the second spatial light modulator and guide the second modulated light beam to the light combining apparatus.

9. The optical engine unit according to claim 2, wherein the light combining apparatus comprises a first prism and a second prism, wherein a light combining surface on which the first prism and the second prism join each other is opposite to a first totally reflective surface, being set on the first prism, wherein the second modulated light beam is reflected by the first totally reflective surface to the light combining surface, and the second prism is configured to guide the first modulated light beam to the light combining surface.

10. The optical engine unit according to claim 2, wherein the light combining apparatus comprises:
    a first prism,
    a second prism, and
    a third prism,
    wherein the second prism is located between the first prism and the third prism; wherein the second modulated light beam is reflected by a third totally reflective surface on which the first prism and the second prism joining each other, to the light combining surface on which the second prism and the third prism joining each other, the third prism being configured to guide the first modulated light beam to the light combining surface, and the emergent light beam being emergent after being guided by the second prism and the first prism.

11. The optical engine unit according to claim 2, wherein the light combining apparatus comprises:
a first prism, and
a second prism,
wherein the first prism further comprises a reflective surface opposite to the light combining surface on which the first prism and the second prism join each other, the second prism further comprises a second totally reflective surface opposite to the light combining surface, the second modulated light beam enters the light combining surface after being reflected by the light combining surface and the reflective surface sequentially, and the first modulated light beam is reflected by the second totally reflective surface to the light combining surface.

12. The optical engine unit according to claim 8, wherein the first guide assembly comprises:
a first prism, and
a second prism,
wherein the first light beam is reflected to the first spatial light modulator by a third totally reflective surface on which the first prism and the second prism join each other; and
the second guide assembly comprises a third prism and a fourth prism, and the second light beam is reflected to the second spatial light modulator by a fourth totally reflective surface on which the third prism and the fourth prism join each other.

13. The optical engine unit according to claim 1, wherein the light splitting assembly splits the illumination beam based on a characteristic of wavelength or polarization.

14. A projection system, comprising:
a light source; and
an optical engine unit, wherein the optical engine unit comprises:
a light splitting assembly configured to split an illumination beam incident on the light splitting assembly into a first light beam and a second light beam;
a first spatial light modulator configured to modulate the first light beam to form a first modulated light beam;
a second spatial light modulator configured to modulate the second light beam to form a second modulated light beam; and
a light combining apparatus comprising a light combining surface, wherein the light combining surface is a coated surface and configured to combine the first modulated light beam and the second modulated light beam into an emergent light beam and emit the emergent light beam, and an incident angle of the first modulated light beam on the light combining surface and that of the second modulated light beam being smaller than a total reflection angle of the light combining surface, and wherein the light source is configured to emit the illumination beam.

15. The projection system according to claim 14, further comprising:
an optical relay system located between the light source and the light splitting assembly and configured to concentrate the illumination beam to a predetermined range.

16. The optical engine unit according to claim 4, wherein, when $\theta=12°$ and $\beta=42°$, a critical angle of a glass prism is 42°, and $\alpha \leq 30°$.

17. The optical engine unit according to claim 10, wherein the fifth totally reflective surface is an anti-reflective coated surface, and reflectivity of the anti-reflective coated surface is smaller than a first preset threshold.

18. The optical engine unit according to claim 10, wherein an incident angle of the emergent light beam on the fifth totally reflective surface is smaller than a total reflection angle of the fifth totally reflective surface.

19. The optical engine unit according to claim 11, wherein the first prism has a reflective surface opposite to the light combining surface, the reflective surface is a high-reflective coated surface, and reflectivity of the high-reflective coated surface is greater than a second preset threshold.

20. The optical engine unit according to claim 19, wherein the second totally reflective surface totally reflects a light ray with an incident angle greater than a second threshold; wherein the second threshold is a critical angle at which a light ray is totally reflected on the second totally reflective surface; and wherein the second totally reflective surface is configured to transmit a light ray with an incident angle smaller than the second threshold.

* * * * *